(12) United States Patent
Mowry, Jr.

(10) Patent No.: US 6,254,007 B1
(45) Date of Patent: Jul. 3, 2001

(54) SECURITY IMAGE ELEMENT TILING SCHEME

(75) Inventor: William H. Mowry, Jr., Dayton, OH (US)

(73) Assignee: The Standard Register Company, Dayton, OH (US)

( * ) Notice: Subject to any disclaimer, the term of this patent is extended or adjusted under 35 U.S.C. 154(b) by 0 days.

(21) Appl. No.: 09/496,704

(22) Filed: Feb. 2, 2000

Related U.S. Application Data (62) Division of application No. 09/277,813, filed on Mar. 26, 1999, now Pat. No. 6,050,607.

(51) Int. Cl.$^7$ ............. G06K 19/06; B42D 15/10
(52) U.S. Cl. ............. 235/494; 235/487; 283/72; 283/57; 283/74
(58) Field of Search ............. 235/379, 375, 235/380, 487, 494

(56) References Cited

U.S. PATENT DOCUMENTS

| | | |
|---|---|---|
| 4,579,370 | 4/1986 | Corwin et al. . |
| 4,688,597 | 8/1987 | Merchant . |
| 5,034,982 | 7/1991 | Henringer et al. . |
| 5,044,668 * | 9/1991 | Wright ................ 283/58 |
| 5,149,140 | 9/1992 | Mowry, Jr. et al. . |
| 5,178,418 | 1/1993 | Merry et al. . |
| 5,197,765 | 3/1993 | Mowry, Jr. et al. . |
| 5,291,243 | 3/1994 | Heckman et al. . |
| 5,297,815 | 3/1994 | Anderson et al. . |
| 5,301,981 | 4/1994 | Nesis . |
| 5,303,370 | 4/1994 | Brosh et al. . |
| 5,340,159 | 8/1994 | Mowry, Jr. . |
| 5,396,559 | 3/1995 | McGrew . |
| 5,445,418 * | 8/1995 | Blend ................ 283/58 |
| 5,479,507 | 12/1995 | Anderson . |
| 5,487,567 | 1/1996 | Volpe . |
| 5,488,664 | 1/1996 | Shamir . |
| 5,510,199 | 4/1996 | Martin . |
| 5,577,774 | 11/1996 | Morikawa et al. . |
| 5,591,527 | 1/1997 | Lu . |

(List continued on next page.)

FOREIGN PATENT DOCUMENTS

| | | |
|---|---|---|
| 509917A1 * | 10/1992 | (EP) . |
| 2 318 324 | 4/1998 | (GB) . |
| 409016734A * | 1/1997 | (JP) . |
| WO 98 22292 | 5/1998 | (WO) . |

Primary Examiner—Michael G. Lee
Assistant Examiner—Jamara A. Franklin
(74) Attorney, Agent, or Firm—Kilworth, Gottman, Hagan & Schaeff, L.L.P.

(57) ABSTRACT

A security document is prepared by designating specialized tiling elements to be printed in selected image element cells across the face of the document. In accordance with one embodiment of the present invention, a method of preparing a security document is provided comprising the steps of: (i) designating a security image area on a face of a document; (ii) dividing the security image area into a plurality of image element cells, such that the image element cells define an array of image element cells across the security image area; and (iii) designating respective printed tiling elements to be printed in selected ones of the image element cells to define a printed security image and a printed complementary security image within the security image area. Individual ones of the respective printed tiling elements comprise printed units positioned within the respective image element cells. The printed units are positioned such that image element cells including the respective printed tiling elements define substantially identical repeating printed elements, and such that individual ones of the repeating printed elements comprise apportioned repeating printed elements. The apportioned repeating printed elements are defined by a combination of printed units from neighboring image element cells.

26 Claims, 8 Drawing Sheets

U.S. PATENT DOCUMENTS

| | | |
|---|---|---|
| 5,601,683 | 2/1997 | Martin . |
| 5,611,575 | 3/1997 | Petrie . |
| 5,708,717 | 1/1998 | Alasia . |
| 5,722,693 | 3/1998 | Wicker . |
| 5,853,197 * | 12/1998 | Mowry, Jr. et al. .................. 283/91 |
| 5,863,075 | 1/1999 | Rich et al. . |
| 5,904,375 | 5/1999 | Brugada . |
| 5,937,110 * | 8/1999 | Petrie et al. ........................ 382/306 |
| 6,000,621 * | 12/1999 | Hecht et al. ........................ 235/494 |
| 6,095,425 * | 8/2000 | Mowry, Jr. ........................... 235/494 |
| 6,139,066 * | 10/2000 | Mowry, Jr. et al. .................. 283/93 |
| 6,161,869 * | 12/2000 | Mowry, Jr. ............................ 283/58 |
| 6,167,147 * | 12/2000 | Mowry, Jr. et al. ................. 382/235 |

* cited by examiner

SECURITY IMAGE ELEMENT TILING SCHEME

CROSS REFERENCE TO RELATED APPLICATIONS

This application is a divisional of U.S. patent application Ser. No. 09/277,813, filed Mar. 26, 1999 now U.S. Pat. No. 6,050,607.

BACKGROUND OF THE INVENTION

The present invention relates to security documents including a security image area composed of a printed security image and a printed complementary security image. The security image area is arranged to provide an indication of document authenticity.

For example, the security image elements and the complementary security image elements may be designed such that an attempted duplication or reproduction results in the formation of a readily apparent warning image on the face of the duplicate document. The security image elements and the complementary security image elements are arranged such that the presence of the security image and the security image elements is not readily apparent on the original. Examples of security documents of this type are illustrated in U.S. Pat. Nos. 4,579,370, 5,149,140, 5,197,765, 5,340,159, the disclosures of which are incorporated herein by reference.

Typically, conventional security documents are constructed by utilizing what is commonly referred to as an orthogonal halftone printing screen. The screen enables production of an orthogonal array of printed dots across the face of the document. Two different screens may be superimposed to produce a security image wherein a security image or warning term is superimposed on a background image. Although the traditional orthogonal printing screens have enjoyed significant commercial use, this conventional security document printing scheme is somewhat limited in its versatility and efficiency.

Further, many conventional security documents include a security image consisting of an orthogonal array of printed elements (see FIG. 5) The orthogonal array is, in many cases, convenient to produce because it complements many of the existing document design schemes available today, including orthogonal halftone screening. However, in certain circumstances, a security image constructed of printed units arranged in an orthogonal array may be more easily recognized by the naked eye or more easily reproduced by duplicating equipment.

Accordingly, there is a need for a more versatile and efficient security document production scheme, preferably one that takes advantage of the computing power available throughout the document production industry and one that does not utilize a conventional orthogonal array of printed elements.

BRIEF SUMMARY OF THE INVENTION

This need is met by the present invention wherein a security image element tiling scheme is provided. A security document is prepared by designating specialized tiling elements to be printed in selected image element cells across the face of the document.

In accordance with one embodiment of the present invention, a method of preparing a security document is provided comprising the steps of: (i) designating a security image area on a face of a document; (ii) dividing the security image area into a plurality of image element cells, such that the image element cells define an array of image element cells across the security image area; and (iii) designating respective printed tiling elements to be printed in selected ones of the image element cells to define a printed security image and a printed complementary security image within the security image area. Individual ones of the respective printed tiling elements comprise printed units positioned within the respective image element cells. The printed units are positioned such that image element cells including the respective printed tiling elements define substantially identical repeating printed elements, and such that individual ones of the repeating printed elements comprise apportioned repeating printed elements. The apportioned repeating printed elements are defined by a combination of printed units from neighboring image element cells.

The printed tiling elements may be designated such that a first type of printed tiling element defines the security image and a second type of printed tiling element defines the complementary security image. The first and second types of printed tiling elements may define substantially equal or different printed tones. The printed tiling elements may also be designated such that the first and second types of printed tiling elements define substantially identical printed unit arrangements of substantially equal printed tones. The printed tiling elements may be further designated such that the first and second types of printed tiling elements define substantially identical printed unit arrangements that are either rotated relative to one another in the plane of the document face or arranged as respective reverse images of one another.

The printed tiling elements may be designated such that the substantially identical repeating printed elements define a substantially uniform repeating element array. The printed tiling elements may also be designated such that individual ones of the repeating printed elements further comprise interior repeating printed elements defined by a combination of printed units within individual image element cells. The printed tiling elements may further be designated such that apportioned repeating printed elements are defined by a quadrant of neighboring image element cells. Additionally, the printed tiling elements may be designated such that adjacent repeating printed elements share at least one printed unit.

The printed tiling elements may be designated such that the printed units further define a substantially uniform array of extraneous printed units in the security image area. Partial extraneous printed units within neighboring image element cells may be provided to complement one another to form a complete extraneous printed unit.

The printed tiling elements may be designated such that they further comprise partial printed units positioned within the respective image element cells. The partial printed units within neighboring image element cells may be arranged such that partial printed units within a quadrant of neighboring image element cells complement one another to form a complete printed unit.

The security image area may be divided such that the image element cells define first and second diagonal axes and a cell center positioned at the intersection of the first and second diagonal axes. Individual ones of the printed tiling elements may be designated such that the printed tiling elements define at least two on-axis printed units and at least two pairs of off-axis printed units. The two on-axis printed units are substantially aligned with the first diagonal axis and are positioned on opposite sides of the cell center. The off-axis printed units are substantially offset from the second diagonal axis and are positioned on opposite sides of the cell center. The printed tiling elements may be designated such that the printed units define a skewed hexagon, wherein the skewed hexagon is characterized by a first diagonal axis dimension that is different than a second diagonal axis dimension.

The printed tiling elements may be designated such that individual ones of the printed tiling elements further comprise partial printed units positioned in respective corners of individual tiling elements. The printed tiling elements may also be designated such that individual ones of the printed tiling elements further comprise two on-axis printed units on each side of the cell center and two pairs of off-axis printed units on each side of the cell center.

The printed tiling elements may be designated such that individual ones of the printed tiling elements further comprise: a central printed unit positioned proximate the cell center; partial printed units positioned in respective corners of individual tiling elements; two on-axis printed units on each side of the cell center; and two pairs of off-axis printed units on each side of the cell center.

In accordance with another embodiment of the present invention, a security document is provided comprising a security image area defined on a face of the document. The security image area is divided into a plurality of image element cells defining an array of image element cells across the security image area. Respective printed tiling elements are printed in selected ones of the image element cells to define a printed security image and a printed complementary security image within the security image area. Individual ones of the printed tiling elements comprise printed units positioned within the respective image element cells. The printed units are positioned such that image element cells including the respective printed tiling elements define substantially identical repeating printed elements, and such that individual ones of the repeating printed elements comprise apportioned repeating printed elements. The apportioned repeating printed elements are defined by a combination of printed units from neighboring image element cells.

In accordance with yet another embodiment of the present invention, a security document is provided comprising a security image area defined on a face of the document. The security image area is divided into a plurality of image element cells defining an array of image element cells across the security image area. Respective printed tiling elements are printed in selected ones of the image element cells to define a printed security image and a printed complementary security image within the security image area. The security image area is divided such that the image element cells define first and second diagonal axes and a cell center positioned at the intersection of the first and second diagonal axes. Individual ones of the printed tiling elements comprise at least two on-axis printed units substantially aligned with the first diagonal axis, wherein the on-axis printed units are positioned on opposite sides of the cell center, and at least two pairs of off-axis printed units substantially offset from the second diagonal axis, wherein the pairs of off-axis printed units are positioned on opposite sides of the cell center.

The security image area is preferably divided such that the image element cells define first and second diagonal axes and a cell center positioned at the intersection of the first and second diagonal axes. Individual ones of the printed tiling elements may be designated such that the printed tiling elements define a skewed hexagon, wherein the skewed hexagon is characterized by a first diagonal axis dimension that is different than a second diagonal axis dimension.

Individual ones of the printed tiling elements may further comprise a central printed unit positioned proximate the cell center, partial printed units positioned in respective corners or along respective edges of individual tiling elements, two on-axis printed units on each side of the cell center, two pairs of off-axis printed units on each side of the cell center, or combinations thereof.

The array of image element cells preferably comprises a uniform array of adjacent rows and columns across said security image area, and the first and second types of printed tiling elements preferably comprise printed units positioned within the uniform array of adjacent rows and columns.

In accordance with yet another embodiment of the present invention, a security document processing system comprises a document issuing station and at least one document receiving station. The document receiving station includes a security document viewer arranged to read a security image printed on a security document designed in accordance with the present invention.

Accordingly, it is an object of the present invention to provide a more versatile and efficient security document production scheme. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

The security document tiling scheme of the present invention is illustrated in detail herein with reference to FIGS. 1–4 and 6–13, where like structure is indicated with like reference numerals. For the purposes of describing and defining the present invention, it should be understood that a security document is a document including a feature or characteristic designed or arranged to prevent successful unauthorized duplication of the document, typically by providing an indication of such on the intended duplicate of the document. The indication of an attempted duplication may be such that it is apparent to the naked eye or such that it is apparent through the use of an optical scanner, special viewing optics, special detection hardware, etc.

Figure 1:
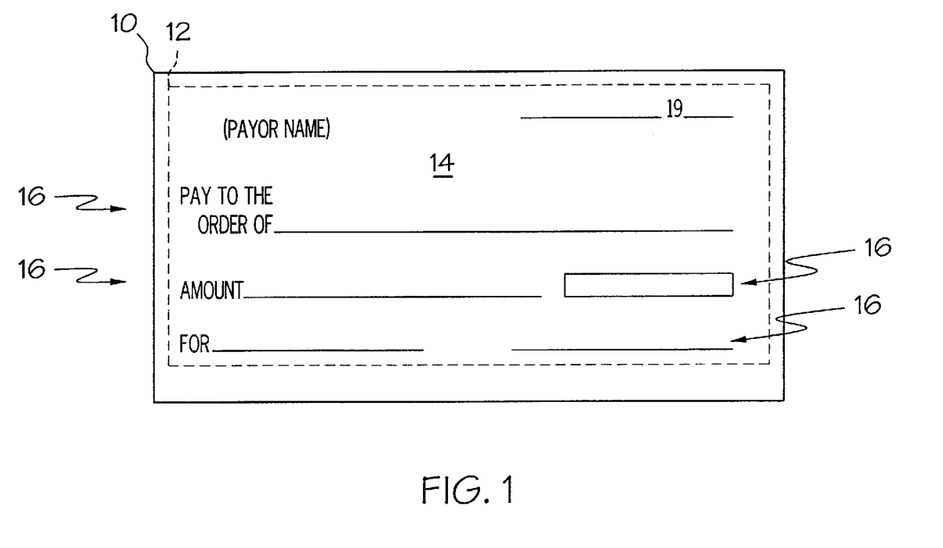
FIG. 1 is a schematic illustration of a security document according to the present invention.

Referring initially to FIG. 1, a security document 10 according to the present invention is prepared by designating a security image area 12 on the face 14 of the document 10. FIG. 1 illustrates the typical positioning of the security image area 12 on the face of the security document 10. It is contemplated by the present invention, however, that the security image area 12 can be arranged to occupy the entire face 14 of the document 10 or merely a specific portion of the face 14 of the document 10. Preferably, the security image area 12 occupies at least the portions of the face 14 dedicated to security data 16, e.g., payor, payee, amount, authorized signature, etc.

Figure 2:
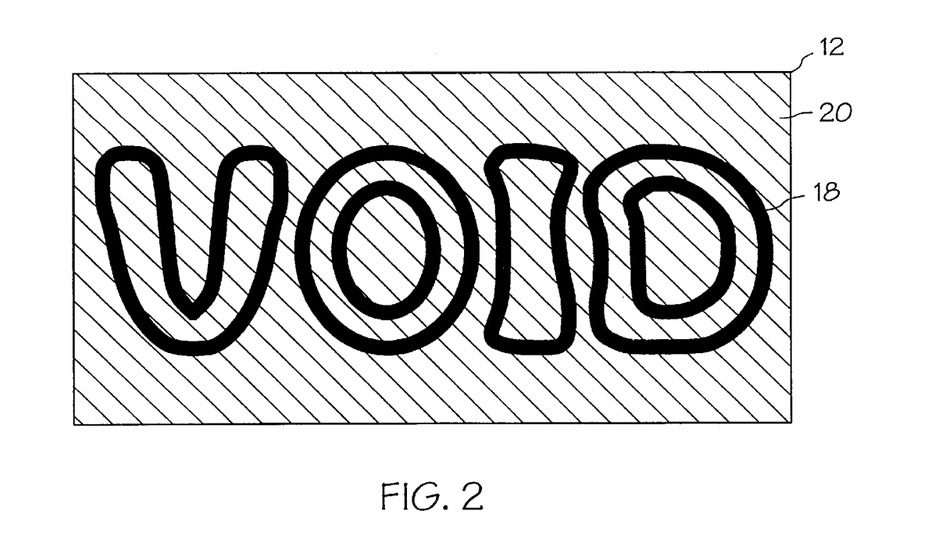
FIG. 2 is a schematic illustration of a security image area according to the present invention.

One example of the content of the security image area 12, according to the present invention is illustrated schematically in FIG. 2 and includes a printed security image 18, represented schematically by the solid lines forming the single "VOID" warning term in FIG. 2, and a printed complementary security image 20, represented schematically by the diagonal lines in FIG. 2. Typically, the complementary security image 20 occupies the portion of the security image area 12 not occupied by the security image 18. However, it is contemplated by the present invention that the security image 18 and the complementary security image 20 may overlap or occupy common portions of the security image area 12. As will be appreciated by those practicing the present invention, the hidden message technology of the present invention requires the utilization of security images and complementary security images that look very much alike to the ordinary observer. Any one of a number of readily available page assembly and drawing programs may be utilized to design the documents of the present invention, e.g., FreeHand 7.0.2, available from Macromedia, Inc., San Francisco, Calif.

It is noted that the present invention is not limited to the single "VOID" arrangement illustrated in FIG. 2 and that the specific content of the security image may vary. For example, U.S. Pat. Nos. 4,341,404, 4,420,175, 4,579,370, 5,149,140, 5,197,765, 5,340,159, the disclosures of which are incorporated herein by reference, illustrate other possible security image arrangements that may be incorporated into the present invention. As a further example, a variety of different image blocks defining different security and complementary security image patterns in each block may also be arranged across the document face, as is disclosed in U.S. Pat. No. 5,853,197, issued on Dec. 29, 1998.

The security image area 12 is divided into a plurality of equally-dimensioned image element cells 22. A single image element cell 22 is demarcated in the image element cell arrays illustrated in FIGS. 3, 4, and 11–13. As will be appreciated by those practicing the present invention, successive image element cells are arranged in a uniform array of adjacent rows and columns across the security image area 12. It is contemplated by the present invention that, in certain embodiments, the image element cells need not all be arranged to have the same dimensions.

Figure 12:
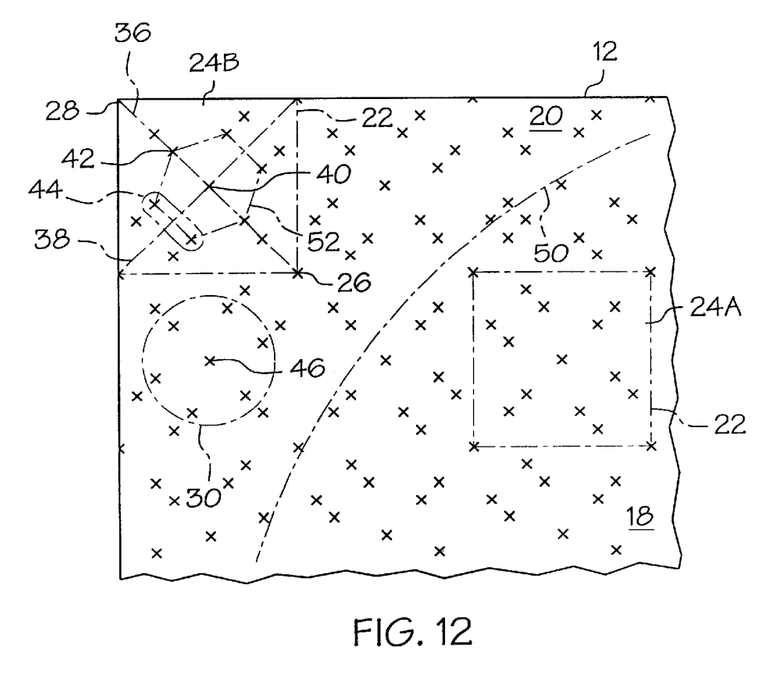
FIG. 12 is a schematic illustration of security image and complementary security image portions of an image element cell array according to the present invention.
Figure 13:
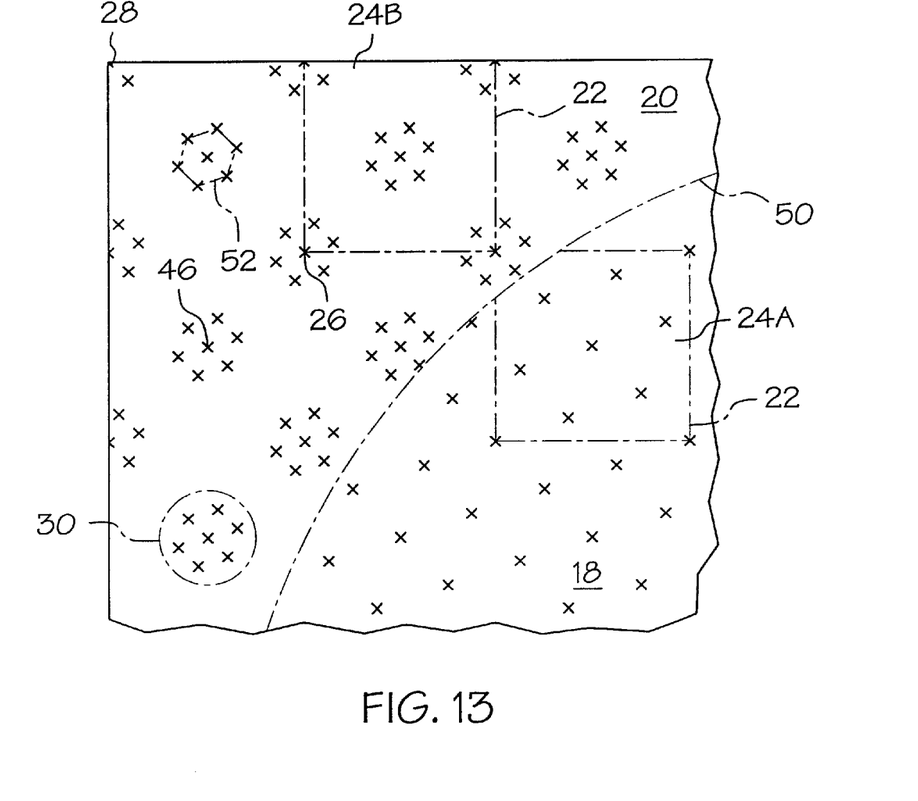
FIG. 13 is a schematic illustration of alternative security image and complementary security image portions of an image element cell array according to the present invention.
Figure 14:
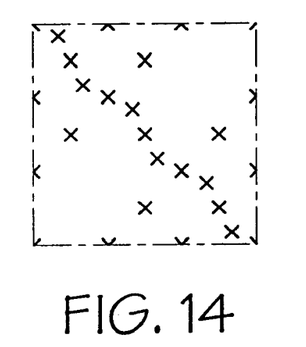
Figure 15:
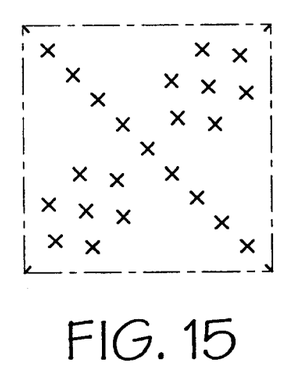

Respective printed tiling elements 24 to be printed in selected ones of the image element cells 22 are designated to define the printed security image 18 and the printed complementary security image 20 within the security image area 12. For the purposes of defining and describing the present invention it is noted that a tiling element 24 comprises the collection of printed matter within an individual image element cell 22. Various printed tiling elements 24 are illustrated in FIGS. 3, 4, and 6–15. FIGS. 12 and 13, described in further detail below, illustrate a portion of the security image area 12 including first and second types of printed tiling elements 24A, 24B defining the security image 18 and the complementary security image 20, respectively. FIGS. 12 and 13 also illustrate the boundary 50 defined between the security image 18 and the complementary security image 20. It is contemplated by the present invention that the boundary 50 could run along the edges of the image element cells 22, as opposed to across the image element cells 22.

Figure 3:
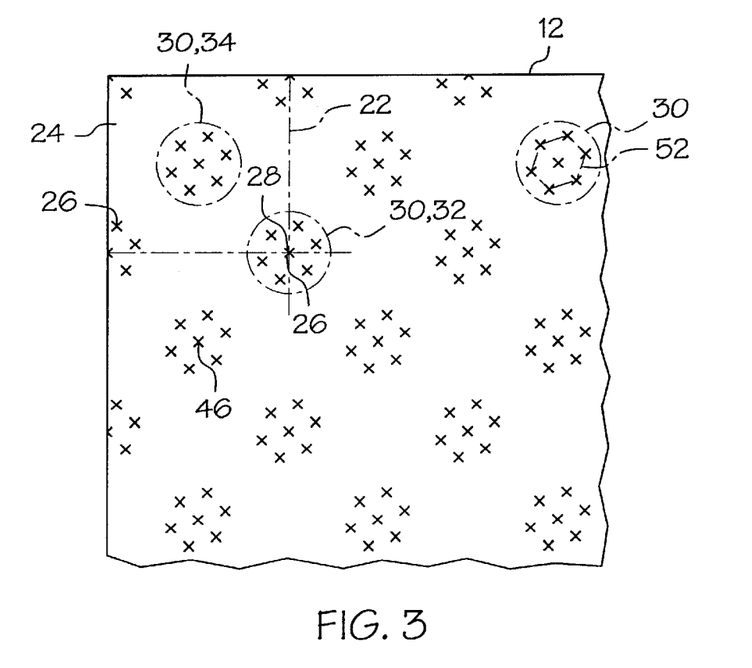
FIG. 3 is a schematic illustration of a portion of an image element cell array according to the present invention.
Figure 5:
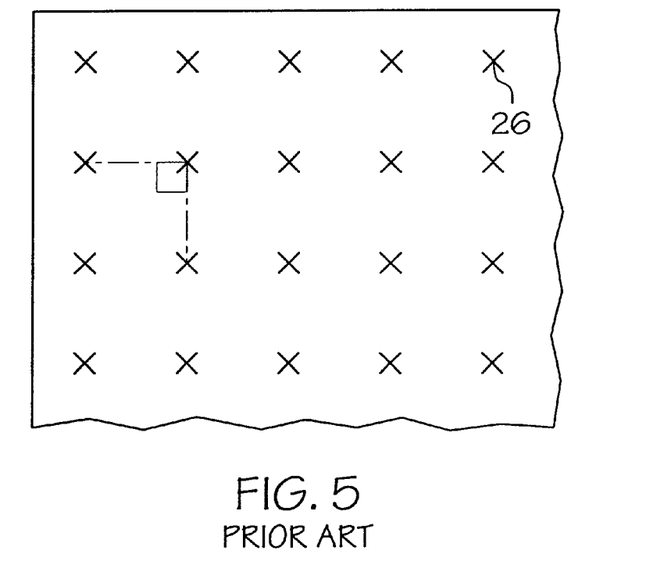
FIG. 5 is a schematic illustration of a portion of a prior art security image including an orthogonal array of printed elements.
Figure 6:
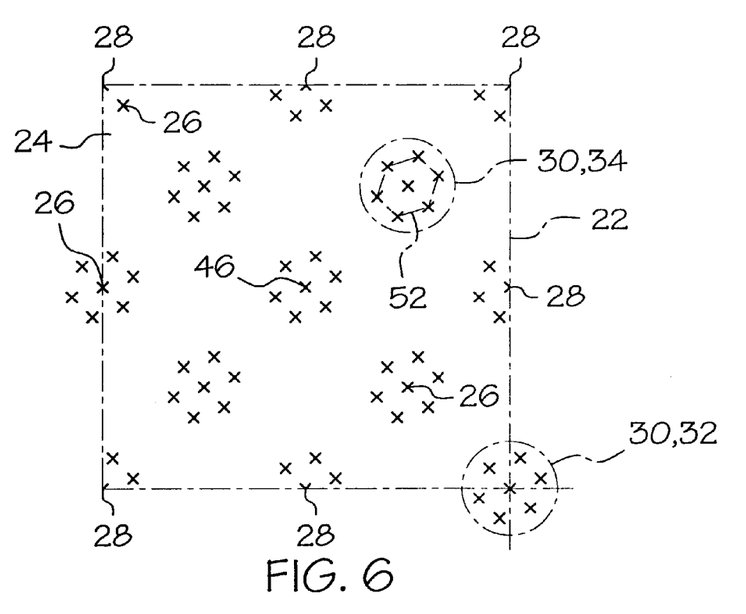
FIG. 6 is a schematic illustration of a tiling element and an apportioned repeating printed element according to the present invention.
Figure 7:
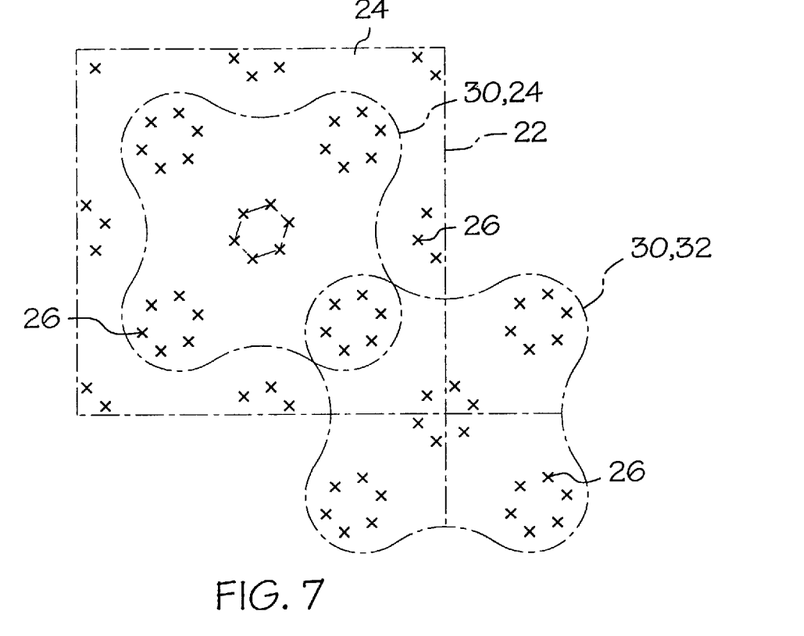
FIGS. 7–10 and 14–15 are schematic illustrations of alternative tiling elements and apportioned repeating printed elements according to the present invention.
Figure 8:
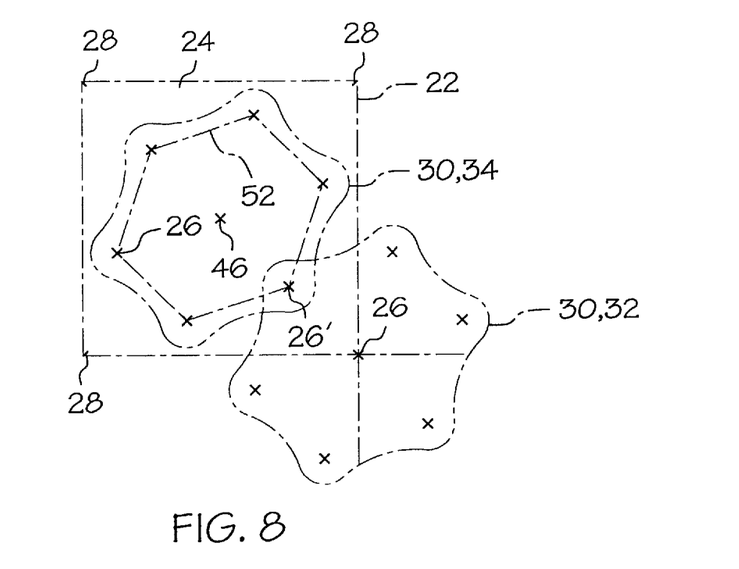

Individual ones of the respective printed tiling elements 24 comprise printed units 26 and partial printed units 28 positioned within the respective image element cells 22 (see FIGS. 3, 6, and 8). Partial printed units 28 within a quadrant of neighboring image element cells 22 (see FIG. 3) or two adjacent image element cells 22 (see FIG. 6) complement one another to form a complete printed unit 26. FIG. 6 arguably presents the best illustration of the distinction between the complete printed units 26 and the partial printed units 28. The printed units 26, 28 are merely illustrated schematically in FIGS. 1–13 of the present invention.

It is contemplated by the present invention that the printed units may be printed dots, squares, lines, circles, stars, or characters of a variety of sizes, or any other graphical shapes suitable for the construction of a security image. For example, in one embodiment of the present invention, the printed units 26 are arranged as illustrated in FIG. 3. Each printed unit is comprised of a plurality of printed pixels. The printed pixels are arranged to form the selected printed unit, which may be, for example, a printed dot. Each image element cell 22 includes the predetermined arrangement of printed dots (see, for example, the arrangement of FIG. 3). Preferably, the printed pixels are arranged in an array and the array is characterized by a frequency of 5080 pixels per inch. Where the printed units are selected to form a dot, the size of the dot may be defined by the limits of a square matrix of 6–12 pixels in width. The size of the image element cell may be defined by the limits of a square matrix of about 112 pixels in width.

Figure 4:
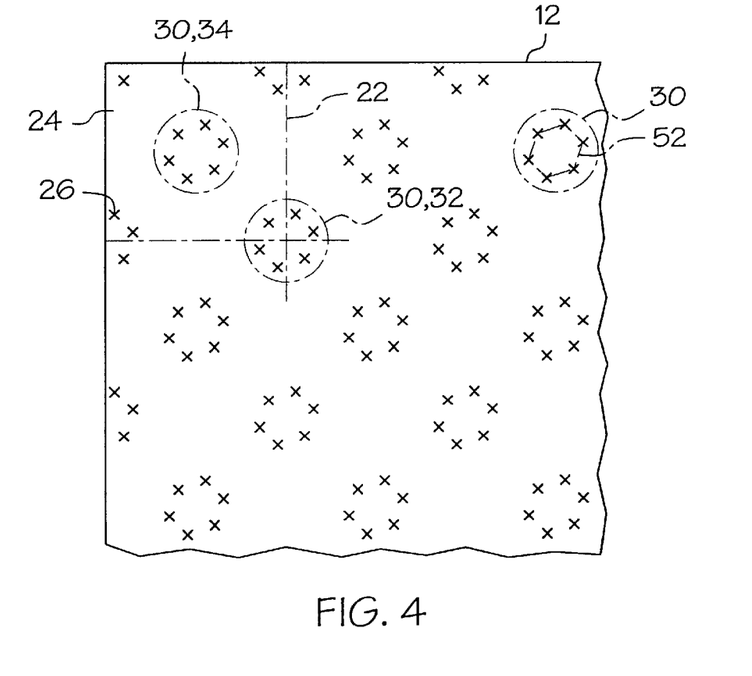
FIG. 4 is a schematic illustration of a portion of an alternative image element cell array according to the present invention.
Figure 9:
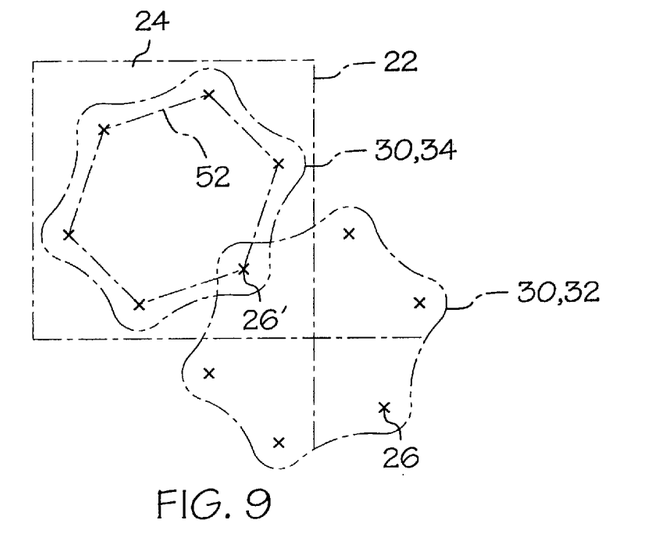

The printed units 26, 28 are positioned such that image element cells 22 including the respective printed tiling elements 24 define substantially identical repeating printed elements 30 defining a substantially uniform repeating element array (see FIGS. 3 and 4). The printed tiling elements 24 illustrated in FIGS. 8 and 9 are designated such that adjacent repeating printed elements 30 share at least one printed unit 26' within a single image element cell 22.

Individual ones of the repeating printed elements 30 comprise either an apportioned repeating printed element 32 or an interior repeating printed element 34 (see FIGS. 3, 4, and 6–10). The apportioned repeating printed elements 32 are defined by a combination of printed units 26 from a quadrant of neighboring image element cells 22. The interior repeating printed elements 34 are defined by a combination of printed units 26 within individual image element cells 22. A comparison of the different repeating printed elements 30 of FIGS. 6 and 7 illustrates the fact that the respective repeating printed elements 30 may be defined to comprise distinctly different collections of repeating printed units 26 from the same basic tiling element 24.

Figure 10:
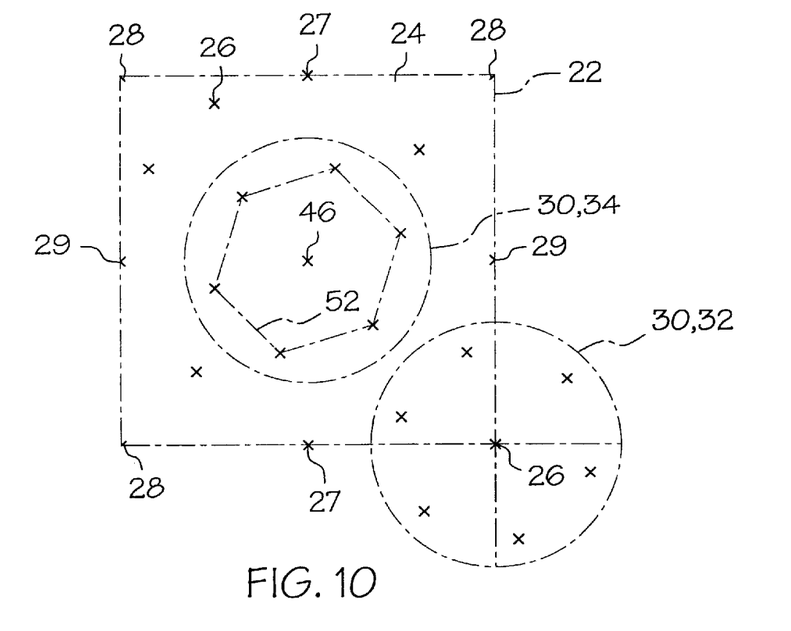
Figure 11:
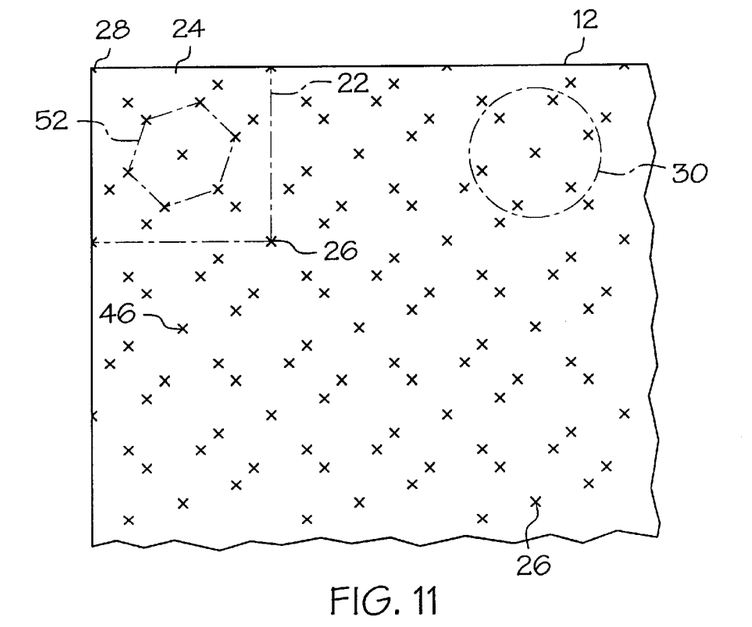
FIG. 11 is a schematic illustration of a portion of an alternative image element cell array according to the present invention.

The printed units 26 further define a substantially uniform array of extraneous printed units 27 in the security image area 12 (see FIG. 10). Partial extraneous printed units 29 within neighboring image element cells complement one another to form a complete extraneous printed unit 27.

Referring now to the conventional arrangement of printed units 26 illustrated in FIG. 5, the printed units 26 therein are arranged in an orthogonal array. In contrast, although the tiling scheme of the present invention utilizes an orthogonal array of image element cells 22 to produce the security image 18 and the complementary security image 20, the images are actually composed of a plurality of printed units 26 arranged in a non-orthogonal array. Thus, according to the present invention, a non-orthogonal array of printed units 26 is created without sacrificing the convenience of the aforementioned orthogonal image element cell array.

Referring in more detail to the embodiments of FIGS. 12 and 13, a first type of printed tiling element 24A defines the security image 18 and a second type of printed tiling element 24B defines the complementary security image 20. A boundary 50 is defined between the security image 18 and the complementary security image 20. In this manner, the two tiling element types 24A, 24B may be designated to create a security document 10 that embodies a hidden indication of authenticity (see "VOID" in FIG. 2). For example, the respective printed tiling elements 22 may be designated such that a specific attempt at reproduction or duplication of the security document 10 exhibits different degrees of effectiveness for each tiling element type. Alternatively, the respective printed tiling elements 22 may be designated such that a specific document decoding scheme will reveal the hidden indication of authenticity.

In FIG. 12, the first and second types of printed tiling elements 24A, 24B define substantially identical printed unit arrangements of substantially equal printed tones. It is contemplated by the present invention that the first and second types of printed tiling elements 24A, 24B may define different printed unit arrangements and different printed tones, in which case it may be advantageous to arrange a conventional camouflage image across the document face 14. The first type of printed tiling element 24A is merely rotated 90° relative to the second type of printed tiling element 24B in the plane of the document face 14. It may also be said that the first type of printed tiling element 24A is arranged to define a reverse image of the second type of printed tiling element 24B.

In the arrangement of FIG. 12, the security image area 12 is divided such that the image element cells 22 define first and second diagonal axes 36, 38 and a cell center 40 positioned at the intersection of the first and second diagonal axes 36, 38. Individual ones of the printed tiling elements 24 are designated such that they define on-axis printed units 42 and pairs of off-axis printed units 44. The on-axis printed units 42 are substantially aligned with the first diagonal axis 36 and are positioned on opposite sides of the cell center 40. The off-axis printed units 44 are substantially offset from the second diagonal axis 38 and are also positioned on opposite sides of the cell center 40.

The printed tiling elements 24 of the FIG. 12 embodiment define a slightly skewed hexagon 52, defined as a hexagon having a dimension along the first diagonal axis 36 that is different than that of the hexagon 52 along the second diagonal axis 38. The corners of the hexagon are defined by two on-axis printed units 42 on each side of the cell center 40 and by two pairs of off-axis printed units 44 on each side of the cell center 40. The printed tiling elements 24 illustrated in FIGS. 3, 4, 6–11, and 13 also define similarly skewed hexagons 52. It is contemplated by the present invention that the printed tiling elements may define any number of additional geometrical shapes, e.g, octagons, pentagons, equilateral hexagons, etc.

In the embodiments of FIGS. 3, 6, 8, and 10–13, a central printed unit 46 is positioned at the cell center 40 and partial printed units 28 are positioned in respective corners of individual tiling elements 22 to complement partial printed units 28 from neighboring quadrant cells to define complete printed units 26. The complete printed units 26 so formed are at the respective centers of further repeating printed elements 30.

According to one method of constructing the security image of the present invention, the security image comprises a plurality of superimposed image layers. Specifically, an image layer defining a complementary security image may be established initially. Next, an image layer defining an opaque mask is superimposed over the complementary security image to define areas in which the security image is to be defined. An image layer defining the security image is then superimposed over the other two layers such that the printed units defining the security image occupy only the opaque areas of the opaque mask layer. Finally, as is noted above, a camouflage image layer may then be superimposed over the entire security image area.

It is contemplated by the present invention that security documents designed in accordance with the present invention may be utilized in a comprehensive security document processing system. Typically, the document processing system would comprise a document issuing station and at least one document receiving station, wherein the document receiving station would include a security document reader or viewer arranged to read data or a security image printed on the security document.

Having described the invention in detail and by reference to preferred embodiments thereof, it will be apparent that modifications and variations are possible without departing from the scope of the invention defined in the appended claims. For example, it is contemplated by the present invention that the repeating printed elements may form any of a variety of predetermined shapes or images, e.g., a dot, a square, a line, a circle, a star, a character, a word, a logo, etc. Further, it is contemplated by the present invention that a camouflage image may be superimposed on the security image and the complementary security image across the document face.

What is claimed is:

1. A method of preparing a security document comprising the steps of:

designating a security image area on a face of a document;

dividing said security image area into a plurality of image element cells, such that said image element cells define an array of image element cells across said security image area; and designating respective printed tiling elements to be printed in selected ones of said image element cells to define a printed security image and a printed complementary security image within said security image area, wherein individual ones of said respective printed tiling elements comprise printed units positioned within said respective image element cells, said printed units are positioned such that image element cells including said respective printed tiling elements define substantially identical repeating printed elements, and such that individual ones of said repeating printed elements comprise apportioned repeating printed elements, and said apportioned repeating printed elements are defined by a combination of printed units from neighboring image element cells.

2. A method of preparing a security document as claimed in claim 1 wherein said printed tiling elements are designated such that a first type of printed tiling element defines said security image and a second type of printed tiling element defines said complementary security image.

3. A method of preparing a security document as claimed in claim 2 wherein said array of image element cells comprises a uniform array of adjacent rows and columns across said security image area, and wherein said first type of printed tiling element and said second type of printed tiling element comprise printed units positioned within said uniform array of adjacent rows and columns.

4. A method of preparing a security document as claimed in claim 1 wherein said printed tiling elements are designated such that said first and second types of printed tiling elements define substantially identical printed unit arrangements of substantially equal printed tones.

5. A method of preparing a security document as claimed in claim 1 wherein said printed tiling elements are designated such that said first and second types of printed tiling elements define substantially different printed tones.

6. A method of preparing a security document as claimed in claim 1 wherein said printed tiling elements are designated such that said first and second types of printed tiling elements define substantially identical printed unit arrangements that are rotated relative to one another in the plane of the document face.

7. A method of preparing a security document as claimed in claim 1 wherein said printed tiling elements are designated such that said first and second types of printed tiling elements define substantially identical printed unit arrangements that are arranged as respective reverse images of one another.

8. A method of preparing a security document as claimed in claim 1 wherein said printed tiling elements are designated such that individual ones of said repeating printed elements further comprise interior repeating printed elements defined by a combination of printed units within individual image element cells.

9. A method of preparing a security document as claimed in claim 1 wherein said printed tiling elements are designated such that apportioned repeating printed elements are defined by a quadrant of neighboring image element cells.

10. A method of preparing a security document as claimed in claim 1 wherein said printed tiling elements are designated such that said printed units further define extraneous printed units within said security image area.

11. A method of preparing a security document as claimed in claim 10 wherein said printed tiling elements are designated such that said printed units define a substantially uniform array of extraneous printed units in said security image area.

12. A method of preparing a security document as claimed in claim 1 wherein said printed units are positioned to further define partial extraneous printed units within said security image area, and wherein partial extraneous printed units within neighboring image element cells complement one another to form a complete extraneous printed unit.

13. A method of preparing a security document as claimed in claim 1 wherein said printed tiling elements are designated such that said printed tiling elements further comprise partial printed units positioned within said respective image element cells.

14. A method of preparing a security document as claimed in claim 13 wherein said printed tiling elements are designated such that partial printed units within neighboring image element cells complement one another to form a complete printed unit.

15. A method of preparing a security document as claimed in claim 1 wherein said printed tiling elements are designated such that said printed tiling elements further comprise partial printed units positioned within said respective image element cells, wherein partial printed units within a quadrant of neighboring image element cells complement one another to form a complete printed unit.

16. A method of preparing a security document as claimed in claim 1 wherein said printed tiling elements are designated such that said printed units define a non-orthogonal array of printed units.

17. A method of preparing a security document as claimed in claim 1 wherein said security image area is divided such that said image element cells define first and second diagonal axes and a cell center positioned at the intersection of said first and second diagonal axes, and wherein individual ones of said printed tiling elements are designated such that said printed tiling elements define:

at least two on-axis printed units substantially aligned with said first diagonal axis, wherein said on-axis printed units are positioned on opposite sides of said cell center; and at least two pairs of off-axis printed units substantially offset from said second diagonal axis, wherein said pairs of off-axis printed units are positioned on opposite sides of said cell center.

18. A method of preparing a security document as claimed in claim 1 wherein said printed tiling elements are designated such that said printed units define a hexagon.

19. A method of preparing a security document as claimed in claim 1 wherein said security image area is divided such that said image element cells define first and second diagonal axes and a cell center positioned at the intersection of said first and second diagonal axes, and wherein individual ones of said printed tiling elements are designated such that said printed tiling elements define a skewed hexagon, wherein said skewed hexagon is characterized by a first diagonal axis dimension that is different than a second diagonal axis dimension.

20. A method of preparing a security document as claimed in claim 1 wherein said printed tiling elements are designated such that individual ones of said printed tiling elements further comprise partial printed units positioned in respective corners of individual tiling elements.

21. A method of preparing a security document as claimed in claim 1 wherein said printed tiling elements are designated such that individual ones of said printed tiling elements further comprise partial printed units positioned along respective edges of individual tiling elements.

22. A method of preparing a security document as claimed in claim 1 wherein said printed tiling elements are designated such that individual ones of said printed tiling elements further comprise two on-axis printed units on each side of said cell center.

23. A method of preparing a security document as claimed in claim 1 wherein said printed tiling elements are designated such that individual ones of said printed tiling elements further comprise two pairs of off-axis printed units on each side of said cell center.

24. A method of preparing a security document as claimed in claim 1 wherein said printed tiling elements are designated such that individual ones of said printed tiling elements further comprise:

a central printed unit positioned proximate said cell center;

partial printed units positioned in respective corners of individual tiling elements;

two on-axis printed units on each side of said cell center; and two pairs of off-axis printed units on each side of said cell center.

25. A method of preparing a security document as claimed in claim 1 wherein said printed tiling elements are designated such that individual ones of said printed tiling elements further comprise a central printed unit positioned proximate said cell center.

26. A method of preparing a security document as claimed in claim 1 wherein said printed tiling elements are designated such that adjacent repeating printed elements share at least one printed unit.

* * * * *